(12) United States Patent
Itoh et al.

(10) Patent No.: US 9,001,544 B2
(45) Date of Patent: *Apr. 7, 2015

(54) INVERTER DEVICE

(71) Applicant: Murata Manufacturing Co., Ltd., Nagaokakyo-shi, Kyoto-fu (JP)

(72) Inventors: Junichi Itoh, Nagaokakyo (JP); Yuichi Noge, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 112 days.

This patent is subject to a terminal disclaimer.

(21) Appl. No.: 13/773,712

(22) Filed: Feb. 22, 2013

(65) Prior Publication Data

US 2014/0063884 A1 Mar. 6, 2014

(30) Foreign Application Priority Data

Aug. 29, 2012 (JP) ................................. 2012-188726

(51) Int. Cl.
*H02M 7/5387* (2007.01)
*H02M 7/487* (2007.01)

(52) U.S. Cl.
CPC ............ *H02M 7/5387* (2013.01); *H02M 7/487* (2013.01)

(58) Field of Classification Search
CPC . H02M 3/33523; H02M 7/003; H02M 7/537; H02M 7/538; H02M 7/5387; H02M 7/53871
USPC .......................... 363/131, 132, 80, 95, 97, 98, 363/56.01–56.12, 16–20, 21.04, 21.1, 21.11
See application file for complete search history.

(56) References Cited

U.S. PATENT DOCUMENTS

| 2005/0139259 | A1* | 6/2005 | Steigerwald et al. | 136/293 |
| 2011/0013438 | A1* | 1/2011 | Frisch et al. | 363/131 |
| 2011/0299312 | A1* | 12/2011 | Karraker et al. | 363/132 |

(Continued)

FOREIGN PATENT DOCUMENTS

| EP | 2 251 969 A1 | 11/2010 |
| JP | 09-163610 A | 6/1997 |

(Continued)

OTHER PUBLICATIONS

Karaki et al., "Experimental Verification of Multi-level Circuit for Single-phase Three-wire System using H-bridge Clamp Circuit," Institute of Electrical Engineers of Japan Industry Applications Tournament, Aug. 21, 2012.

(Continued)

*Primary Examiner* — Adolf Berhane
*Assistant Examiner* — Kevin H Sprenger
(74) *Attorney, Agent, or Firm* — Keating & Bennett, LLP

(57) ABSTRACT

In an inverter device, a first three-level circuit includes first to fourth preceding-stage switch elements connected in series between a first input end and a ground and a first charging and discharging capacitor. A second three-level circuit includes fifth to eighth preceding-stage switch elements connected in series between a second input end and the ground and a second charging and discharging capacitor. The first and second two three-level circuits define a five-level circuit that is subjected to switching with the carrier frequency of PWM modulation. The output polarity of a subsequent-stage bridge clamping circuit is inverted between the anterior half cycle and the posterior half cycle of a power supply frequency.

15 Claims, 24 Drawing Sheets

(56) References Cited

U.S. PATENT DOCUMENTS

2012/0134189 A1* 5/2012 Krein .............................. 363/98
2012/0218795 A1* 8/2012 Mihalache ..................... 363/97
2013/0155747 A1* 6/2013 Wang ........................... 363/132

FOREIGN PATENT DOCUMENTS

JP      2006-223009 A     8/2006
JP      2010-246267 A     10/2010

OTHER PUBLICATIONS

Toboku et al., "Verification of Multi-Level Circuit for Single-Phase Three-Wire System Interconnection Using H-Bridge Circuit Clamp", Institute of Electrical Engineers of Japan Industry Applications Tournament, Aug. 21, 2012.

* cited by examiner

FIG. 4

| STATE | H | Mc | Md | L |
|---|---|---|---|---|
| Vo | Vdc/2 | Vdc/4 | Vdc/4 | 0 |
| S1 | ON | ON | OFF | OFF |
| S2 | ON | OFF | ON | OFF |
| S3 | OFF | ON | OFF | ON |
| S4 | OFF | OFF | ON | ON |

FIG. 8

| STATE | H | Mc | Md | L |
|---|---|---|---|---|
| Vo | −Vdc/2 | −Vdc/4 | −Vdc/4 | 0 |
| S5 | OFF | OFF | ON | ON |
| S6 | OFF | ON | OFF | ON |
| S7 | ON | OFF | ON | OFF |
| S8 | ON | ON | OFF | OFF |

FIG. 12

| | S1 | S2 | S3 | S4 | S5 | S6 | S7 | S8 | S1U =S2W | S2U =S1W | Vu INSTANTANEOUS VOLTAGE OF TERMINAL U | Vw INSTANTANEOUS VOLTAGE OF TERMINAL W |
|---|---|---|---|---|---|---|---|---|---|---|---|---|
| CP1(H) | ON | ON | OFF | OFF | OFF | OFF | ON | ON | ON | OFF | Vdc/2 | -Vdc/2 |
| CP2(Mc) | ON | OFF | ON | OFF | OFF | ON | OFF | ON | ON | OFF | Vdc/4 | -Vdc/4 |
| CP3(Md) | OFF | ON | OFF | ON | ON | OFF | ON | OFF | ON | OFF | Vdc/4 | -Vdc/4 |
| CP4(L) | OFF | OFF | ON | ON | ON | ON | OFF | OFF | ON | OFF | 0 | 0 |
| CP5(L) | OFF | OFF | ON | ON | ON | ON | OFF | OFF | OFF | ON | 0 | 0 |
| CP6(Md) | OFF | ON | OFF | ON | OFF | ON | OFF | ON | OFF | ON | -Vdc/4 | Vdc/4 |
| CP7(Mc) | ON | OFF | ON | OFF | OFF | ON | OFF | ON | OFF | ON | -Vdc/4 | Vdc/4 |
| CP8(H) | ON | ON | OFF | OFF | OFF | OFF | ON | ON | OFF | ON | -Vdc/2 | Vdc/2 |

FIG. 16

| TIME DIVISION | Vu* TARGET VALUE OF Vu DIVISION | Vw* TARGET VALUE OF Vw DIVISION | SWITCHING PATTERN |
|---|---|---|---|
| I, III | [0~+Vdc/4] | [0~-Vdc/4] | CP4 ⇄ (CP2⇄CP3) |
| II | [+Vdc/4~+Vdc/2] | [-Vdc/4~-Vdc/2] | (CP2⇄CP3) ⇄ CP1 |
| IV, VI | [0~-Vdc/4] | [0~+Vdc/4] | CP5 ⇄ (CP6⇄CP7) |
| V | [-Vdc/4~-Vdc/2] | [+Vdc/4~+Vdc/2] | (CP6⇄CP7) ⇄ CP8 |

FIG. 19A

|  | S1 | S2 | S3 | S4 | OUTPUT VOLTAGE OF FIRST THREE-LEVEL CIRCUIT |
|---|---|---|---|---|---|
| CP1 | ON | ON | OFF | OFF | +Vdc/2 |
| CP2 | ON | OFF | ON | OFF | +Vdc/4 |
| CP3 | OFF | ON | OFF | ON | +Vdc/4 |
| CP4 | OFF | OFF | ON | ON | 0 |

FIG. 19B

|  | S5 | S6 | S7 | S8 | OUTPUT VOLTAGE OF SECOND THREE-LEVEL CIRCUIT |
|---|---|---|---|---|---|
| CP5 | ON | ON | OFF | OFF | 0 |
| CP6 | OFF | ON | OFF | ON | −Vdc/4 |
| CP7 | ON | OFF | ON | OFF | −Vdc/4 |
| CP8 | OFF | OFF | ON | ON | −Vdc/2 |

FIG. 20

| TIME DIVISION | THREE-LEVEL CIRCUIT | SWITCHING PATTERN | BRIDGE CLAMPING CIRCUIT | Vu ~ AVERAGE VOLTAGE OF TERMINAL U | Vw ~ AVERAGE VOLTAGE OF TERMINAL W |
|---|---|---|---|---|---|
| I , III | FIRST | CP4 ⇌ (CP2 ⇌ CP3) | S1U=S2W=ON S2U=S1W=OFF | [0~+Vdc/4] | [−Vdc/4~0] |
|  | SECOND | CP5 ⇌ (CP6 ⇌ CP7) |  |  |  |
| II | FIRST | (CP2 ⇌ CP3) ⇌ CP1 |  | [+Vdc/4~+Vdc/2] | [−Vdc/2~−Vdc/4] |
|  | SECOND | (CP6 ⇌ CP7) ⇌ CP8 |  |  |  |
| IV , VI | FIRST | CP4 ⇌ (CP2 ⇌ CP3) | S1U=S2W=OFF S2U=S1W=ON | [−Vdc/4~0] | [0~+Vdc/4] |
|  | SECOND | CP5 ⇌ (CP6 ⇌ CP7) |  |  |  |
| V | FIRST | (CP2 ⇌ CP3) ⇌ CP1 |  | [−Vdc/2~−Vdc/4] | [+Vdc/4~+Vdc/2] |
|  | SECOND | (CP6 ⇌ CP7) ⇌ CP8 |  |  |  |

INVERTER DEVICE

BACKGROUND OF THE INVENTION

1. Field of the Invention

The present invention relates to a DC/AC inverter device, and, in particular, relates to an inverter device including a multilevel circuit.

2. Description of the Related Art

In recent years, for example, solar power generation systems have prevailed, and, from a viewpoint of the high efficiency thereof, non-insulated types have entered the mainstream of power-system-interconnected inverters (hereinafter, a power system is simply referred to as a "system"). So as to generate a substantially sinusoidal voltage in an insulated type inverter (so as to inject a substantially sinusoidal current into a system), an inverter device has been disclosed, for example, in Japanese Unexamined Patent Application Publication No. 2006-223009, the inverter device being equipped with a multilevel circuit outputting a plurality of voltages whose number is greater than or equal to three.

In FIG. 1 in Japanese Unexamined Patent Application Publication No. 2006-223009, the configuration of a five-level inverter is disclosed where a series circuit including four capacitors and a series circuit including eight switch elements are provided between the positive and negative electrode terminals of a direct-current power supply and switch elements and diodes are connected between the connection points of these capacitors and the connection points of these switch elements.

When an inverter device cooperating with a system is configured, three sets of the single-phase inverter devices are provided in an inverter device connected to, for example, a system of a three-phase alternating current. In addition, so as to configure an inverter device connected to, for example, a household single-phase three-wire system, two sets of the single-phase inverter devices are provided.

However, if the number of levels is n, switch elements whose number is 2(n−1) are necessary for a multilevel circuit. Therefore, in particular, for household use, an increase in the cost of a semiconductor element or another passive component becomes a major issue.

SUMMARY OF THE INVENTION

Accordingly, preferred embodiments of the present invention provide an inverter device that is capable of being provided with a small number of switch elements and which is small and low in cost.

According to a preferred embodiment of the present invention, an inverter device includes a first three-level circuit including first, second, third and fourth preceding-stage switch elements connected in series between a first input end of a direct-current power supply and a neutral point and a first charging and discharging capacitor including a first end connected to a connection point between the first preceding-stage switch element and the second preceding-stage switch element and a second end that is connected to a connection point between the third preceding-stage switch element and the fourth preceding-stage switch element, a second three-level circuit including fifth, sixth, seventh and eighth preceding-stage switch elements connected in series between a neutral point and a second input end of the direct-current power supply and a second charging and discharging capacitor including a first end that is connected to a connection point between the fifth preceding-stage switch element and the sixth preceding-stage switch element and a second end that is connected to a connection point between the seventh preceding-stage switch element and the eighth preceding-stage switch, a bridge clamping circuit (subsequent-stage switching circuit) including first, second, third and fourth subsequent-stage switch elements bridge-connected to first, second, third and fourth terminals wherein a first end is connected to a connection point between the second preceding-stage switch element and the third preceding-stage switch element and a second end is connected to a connection point between the sixth preceding-stage switch element and the seventh preceding-stage switch element, a first inductor connected between a first output end and a connection point between the first subsequent-stage switch element and the second subsequent-stage switch element in the bridge clamping circuit, and a second inductor connected between a second output end and a connection point between the third subsequent-stage switch element and the fourth subsequent-stage switch element in the bridge clamping circuit.

As a result of this configuration, a multilevel circuit is simply configured including switch elements whose number is smaller than a multilevel circuit included in an inverter device of the related art, and it is possible to provide a small and low-cost inverter device.

It is preferable that the first subsequent-stage switch element and the fourth subsequent-stage switch element are simultaneously turned on or off, the second subsequent-stage switch element and the third subsequent-stage switch element are simultaneously turned off or on, and the switching frequencies of the first to fourth subsequent-stage switch elements are the frequency of an alternating-current power supply voltage (the frequency of a system), and it is desirable that the switching frequencies of the first to eighth switch elements are higher than the switching frequencies of the first to fourth subsequent-stage switch elements, and frequencies at which a smoothing effect due to the first inductor and the second inductor occurs.

As a result of this configuration, it is possible to use the inverter device as an inverter device supplying electric power to the system.

It is preferable that the inverter device further includes two capacitors connected between the first input end and the second input end of the direct-current power supply and connected in series, and a capacitor voltage-dividing circuit whose neutral point is a connection point between the two capacitors.

As a result of this configuration, a direct-current voltage having a single polarity is input, and it is possible to generate a substantially sinusoidal voltage based on a single-phase three-wire system.

It is preferable that the first to eighth preceding-stage switch elements are MOS-FETs, for example. Accordingly, it is possible to further reduce the cost of the inverter device.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 4 is a diagram illustrating a relationship between states of four switch elements in the first three-level circuit and an output voltage (electric potential).

FIG. 8 is a diagram illustrating a relationship between states of four switch elements in the second three-level circuit and an output voltage (electric potential).

FIG. 12 is a diagram illustrating a relationship among the states of the eight preceding-stage switch elements, the states of the four subsequent-stage switch elements, and instantaneous values of output voltages.

FIG. 16 is a diagram illustrating a relationship among time divisions and voltage divisions in FIG. 15 and switching patterns.

FIG. 19A is a diagram illustrating a relationship between the states of the switch elements in the first three-level circuit and the output voltage thereof in an inverter device in a second preferred embodiment of the present invention, and FIG. 19B is a diagram illustrating a relationship between the states of the switch elements in the second three-level circuit and the output voltage thereof.

FIG. 20 is a diagram illustrating a relationship among a time division illustrated in FIG. 15, the switching patterns of the first and second three-level circuits, a state of a bridge clamping circuit, and average voltages of terminals.

DETAILED DESCRIPTION OF THE PREFERRED EMBODIMENTS

Preferred embodiments of the present invention will be sequentially described with reference to individual drawings.

First Preferred Embodiment

Figure 1:
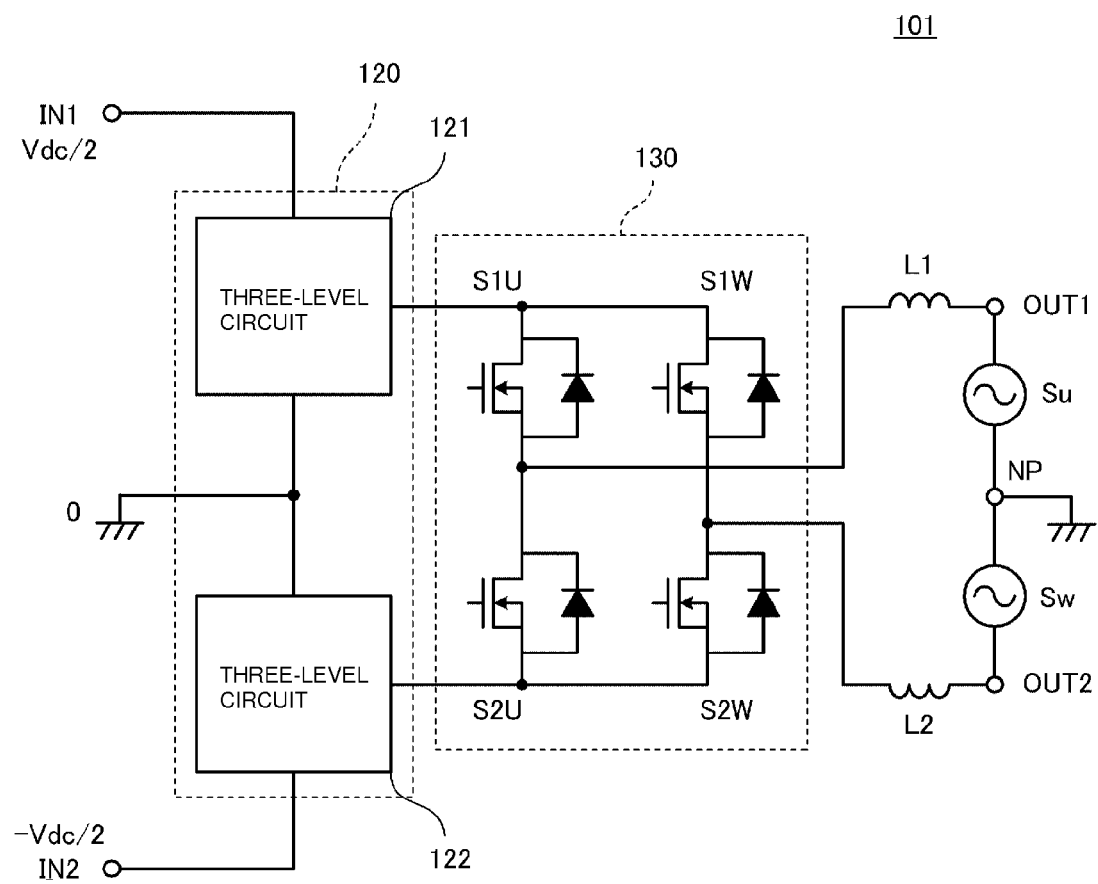
FIG. 1 is a partially blocked circuit diagram of an inverter device according to a first preferred embodiment of the present invention.

FIG. 1 is the partially blocked circuit diagram of an inverter device 101 according to a first preferred embodiment of the present invention. The inverter device 101 preferably includes a first input end IN1 and a second input end IN2, into which direct-current power supply voltages are input, and a first output end OUT1 and a second output end OUT2, from which alternating-current voltages are output. Direct-current voltages generated due to, for example, a solar power generation panel are applied to the first input end IN1 and the second input end IN2. In FIG. 1, Su and Sw indicate a single-phase three-wire system having a U-phase and a W-phase. An alternating-current voltage whose effective voltage preferably is about 100 V, for example, is applied between the first output end OUT1 and a neutral point NP, an alternating-current voltage whose effective voltage preferably is about 100 V, for example, is applied between the neutral point NP and the second output end OUT2, and an alternating-current voltage whose effective voltage preferably is about 200 V, for example, is applied between the first output end OUT1 and the second output end.

A first three-level circuit 121 is connected between the first input end IN1 and a ground, and a second three-level circuit 122 is connected between the second input end IN2 and the ground.

A bridge clamping circuit 130 is connected between the first three-level circuit 121 and the second three-level circuit 122.

A first inductor L1 is connected between the first output end OUT1 and a connection point between a first subsequent-stage switch element S1U and a second subsequent-stage switch element S2U in the bridge clamping circuit 130. A second inductor L2 is connected between the second output end OUT2 and a connection point between a third subsequent-stage switch element S1W and a fourth subsequent-stage switch element S2W in the bridge clamping circuit 130.

As a result of the two three-level circuits 121 and 122, a preceding-stage switching circuit 120 is provided. Accordingly, the bridge clamping circuit 130 may also be called a "subsequent-stage switching circuit".

Each of the first three-level circuit 121 and the second three-level circuit 122 outputs an electric potential falling within a range from an input electric potential on a high (H) side to an input electric potential on a low (L) side. Vdc/2 is applied to the first input end IN1, and −Vdc/2 is applied to the second input end IN2. Accordingly, as for the first three-level circuit 121, since the electric potential on the high (H) side is Vdc/2 and the electric potential on the low (L) side is 0, the electric potential of the output end of the first three-level circuit 121 ranges from Vdc/2 to 0. In addition, as for the second three-level circuit 122, since the electric potential on the high (H) side is 0 and the electric potential on the low (L) side is −Vdc/2, the electric potential of the output end of the second three-level circuit 122 ranges from 0 to −Vdc/2. Accordingly, as a result of the first three-level circuit 121 and the second three-level circuit 122, the preceding-stage switching circuit 120 defines and functions as a five-level circuit performing voltage conversion using five voltage levels.

The bridge clamping circuit 130 switches between a state (first state) where the output of the first three-level circuit 121 is connected (clamped) to the first output end OUT1 through the inductor L1 and the output of the second three-level circuit 122 is connected (clamped) to the second output end OUT2 through the inductor L2 and a state (second state) where the output of the first three-level circuit 121 is connected (clamped) to the second output end OUT2 through the inductor L2 and the output of the second three-level circuit 122 is connected (clamped) to the first output end OUT1 through the inductor L1. The first state corresponds to the anterior half cycle of the power supply frequency of a system, and the second state corresponds to the posterior half cycle of the power supply frequency of the system.

Figure 2:
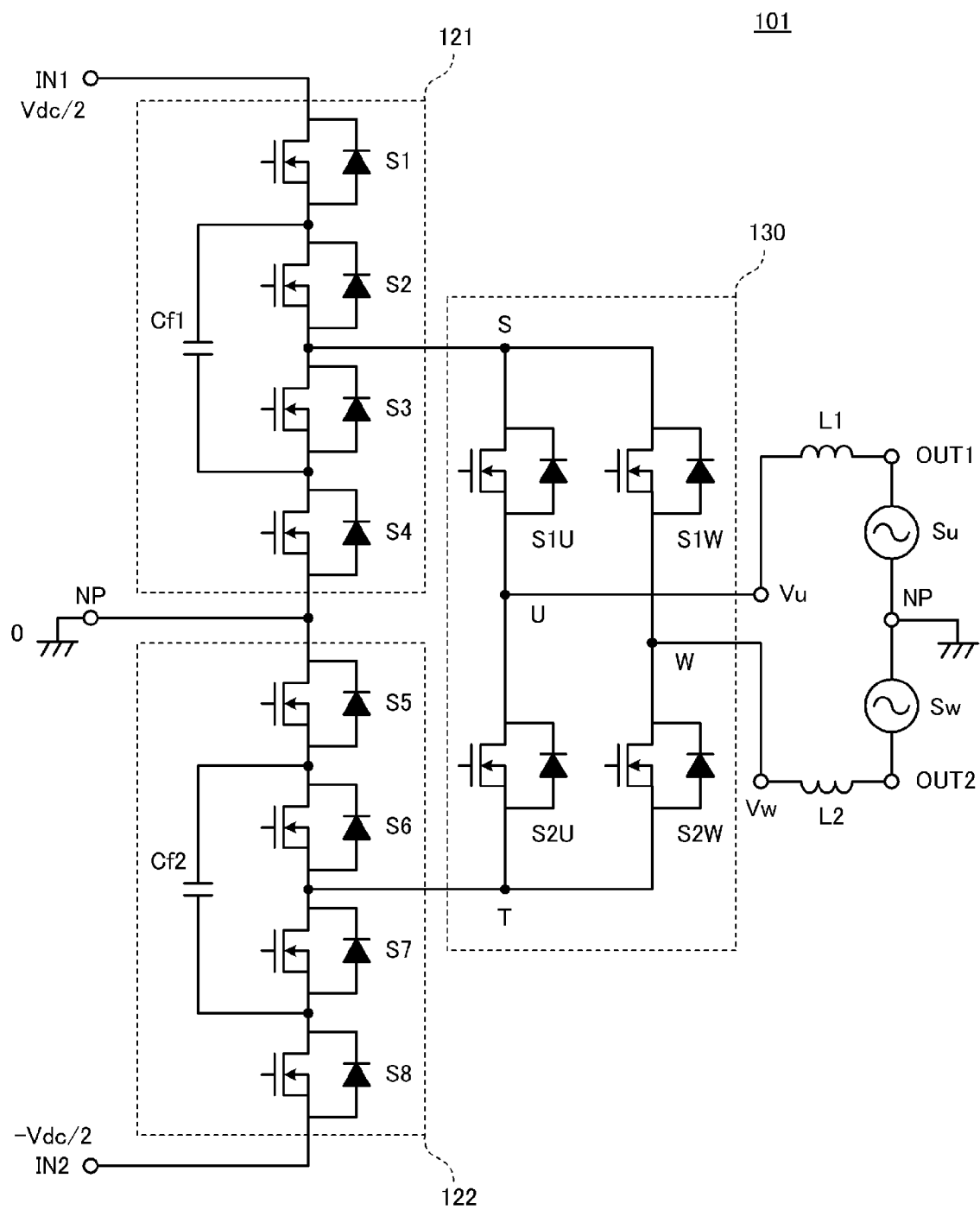
FIG. 2 is a circuit diagram of the inverter device shown in FIG. 1.

FIG. 2 is the circuit diagram of the inverter device 101. The first three-level circuit 121 includes first, second, third and fourth preceding-stage switch elements (S1 to S4) connected in series between the first input end IN1 and the ground and a first charging and discharging capacitor (Cf1) including a first end that is connected to a connection point between the first preceding-stage switch element S1 and the second preceding-stage switch element S2 and including a second end that is connected to a connection point between the third preceding-stage switch element S3 and the fourth preceding-stage switch element S4. In addition, the second three-level circuit 122 includes fifth, sixth, seventh and eighth preceding-stage switch elements (S5 to S8) connected in series between the second input end IN2 and the ground and a second charging and discharging capacitor (Cf2) including a first end that is connected to a connection point between the fifth preceding-stage switch element S5 and the sixth preceding-stage switch element S6 and including a second end that is connected to a connection point between the seventh preceding-stage switch element S7 and the eighth preceding-stage switch element S8.

The bridge clamping circuit 130 includes first, second, third and fourth subsequent-stage switch elements S1U, S2U, S1W, and S2W bridge-connected to first, second, third and fourth terminals S, T, U, and W. The first terminal S is connected to a connection point between the second preceding-stage switch element S2 and the third preceding-stage switch element S3, and the second terminal T is connected to a connection point between the sixth preceding-stage switch element S6 and the seventh preceding-stage switch element S7. In addition, the third terminal U is connected to a connection point between the first subsequent-stage switch element S1U and the second subsequent-stage switch element S2U, and the fourth terminal W is connected to a connection point between the third subsequent-stage switch element S1W and the fourth subsequent-stage switch element S2W.

Each of the eight preceding-stage switch elements S1 to S8 and the four subsequent-stage switch elements S1U, S2U, S1W, and S2W preferably is a MOS-FET, and body diodes are also illustrated in FIG. 2. Since the three-level circuits 121 and 122 are connected in series, it is possible to use a low-voltage switch element for each of the eight switch elements S1 to S8. Therefore, it is possible to configure the eight preceding-stage switch elements S1 to S8 using the MOS-FETs without using Insulated Gate Bipolar Transistors (IGBTs), and it is also possible to reduce the costs thereof.

Figure 3:
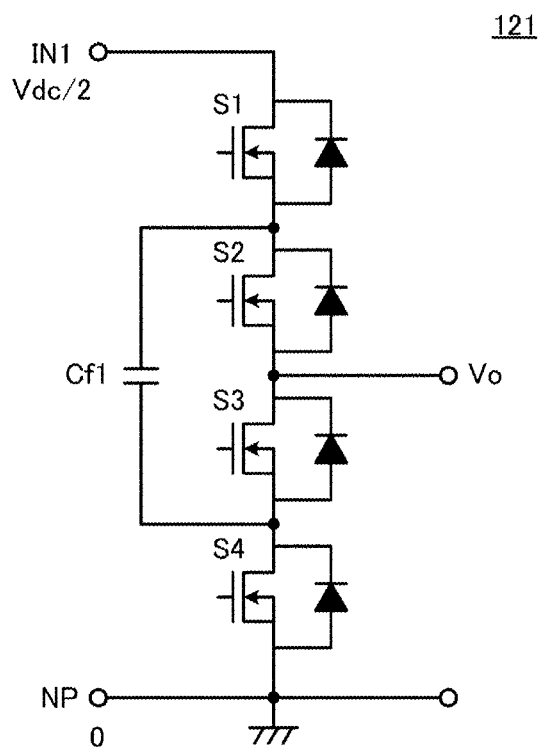
FIG. 3 is a circuit diagram of a first three-level circuit.

FIG. 3 is the circuit diagram of the first three-level circuit 121, and FIG. 4 is a diagram illustrating a relationship between the states of the four switch elements S1 to S4 therein and an output voltage (electric potential) Vo. Here, the four switch elements S1 to S4 may be put into four states H, Mc, Md, and L.

Figure 5:
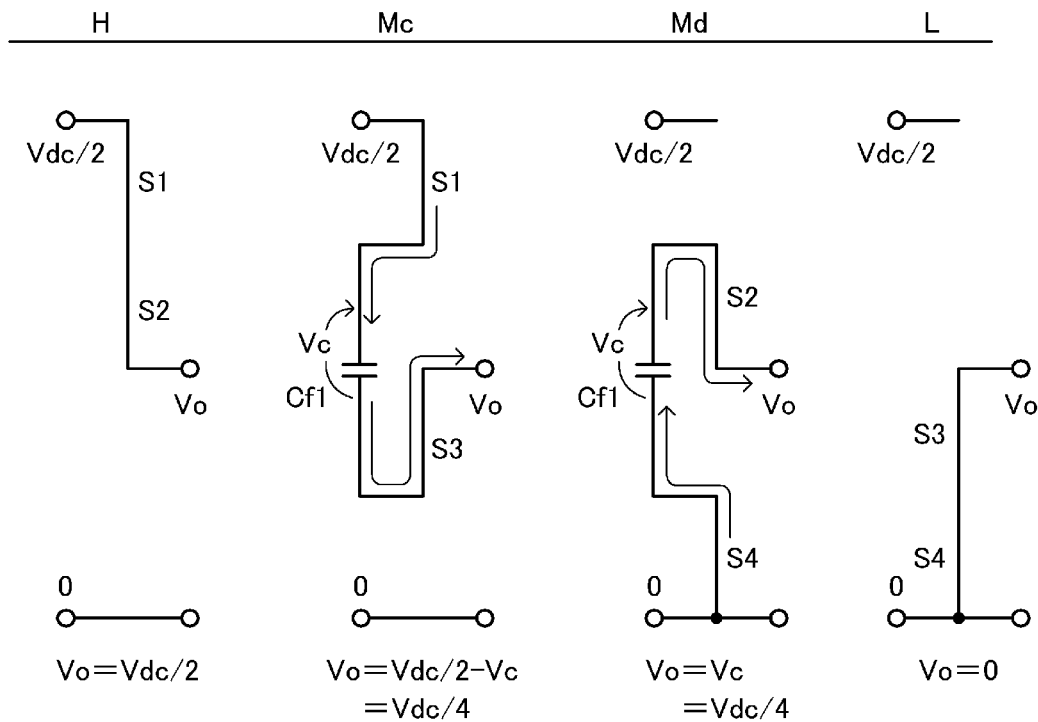
FIG. 5 illustrates equivalent circuit diagrams of the first three-level circuit in four states.

FIG. 5 illustrates the equivalent circuit diagrams of the first three-level circuit 121 in the four states. In the state H, since the switch elements S1 and S2 are turned on (ON) and the switch elements S3 and S4 are turned off (OFF), the output voltage Vo is Vdc/2. In the state L, since the switch elements S3 and S4 are turned on (ON) and the switch elements S1 and S2 are turned off (OFF), the output voltage Vo is 0. In the state Mc, since the switch elements S1 and S3 are turned on (ON) and the switch elements S2 and S4 are turned off (OFF), the output voltage Vo is Vdc/2−Vc. Here, the Vc is the charging voltage of the first charging and discharging capacitor Cf1. When it is assumed that Vc=Vdc/4 is satisfied, the output voltage Vo=Vdc/4 is satisfied. In the state Md, since the switch elements S2 and S4 are turned on (ON) and the switch elements S1 and S3 are turned off (OFF), the output voltage Vo is Vc. Here, when it is assumed that Vc=Vdc/4 is satisfied, the output voltage Vo=Vdc/4 is satisfied. Since the charging charge amount and the discharging charge amount of the first charging and discharging capacitor Cf1 may be deemed to be equal to each other, the output voltage Vo in the state Mc and the output voltage Vo in the state Md are equal to each other. In other words, the charging voltage Vc of the first charging and discharging capacitor Cf1 is charged and discharged while centering on Vdc/4 serving as a half of Vdc/2. If a charging and discharging time constant for the first charging and discharging capacitor Cf1 is sufficiently large with respect to a switching frequency, the fluctuation range of the charging voltage Vc is small, and it may be possible to be deemed as Vc≈Vdc/4. The fluctuation of the output voltage Vo due to the charge and discharge of the first charging and discharging capacitor Cf1 will be described later.

Figure 6:
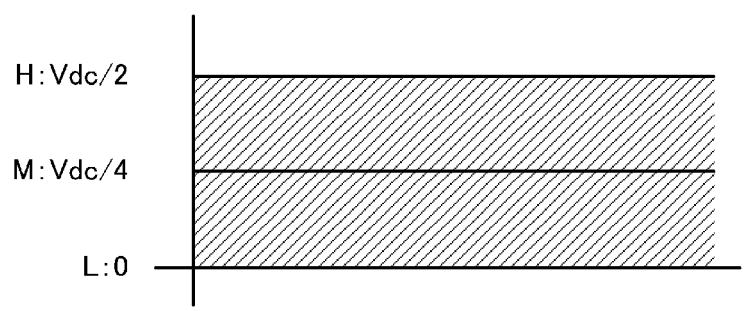
FIG. 6 is a diagram illustrating a range of a voltage capable of being obtained on the basis of an output voltage of the first three-level circuit.

FIG. 6 is a diagram illustrating the range of a voltage capable of being obtained on the basis of the output voltage of the first three-level circuit 121. As described above, as a result of the switching of the four switch elements S1 to S4, the four states H, Mc, Md, and L are selected, and hence it is possible to output a voltage in the range of Vdc/2 to 0.

Figure 7:
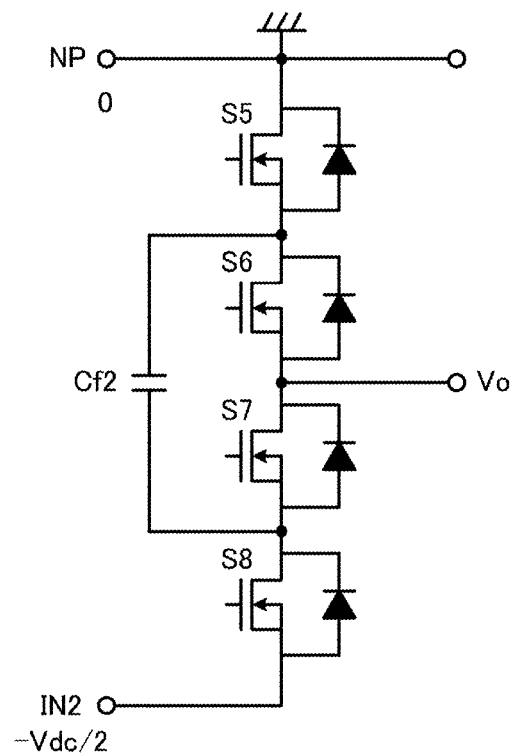
FIG. 7 is a circuit diagram of a second three-level circuit.

FIG. 7 is the circuit diagram of the second three-level circuit 122, and FIG. 8 is a diagram illustrating a relationship between the states of the four switch elements S5 to S8 therein and an output voltage (electric potential) Vo. Here, the four switch elements S5 to S8 may be put into four states H, Mc, Md, and L.

Figure 9:
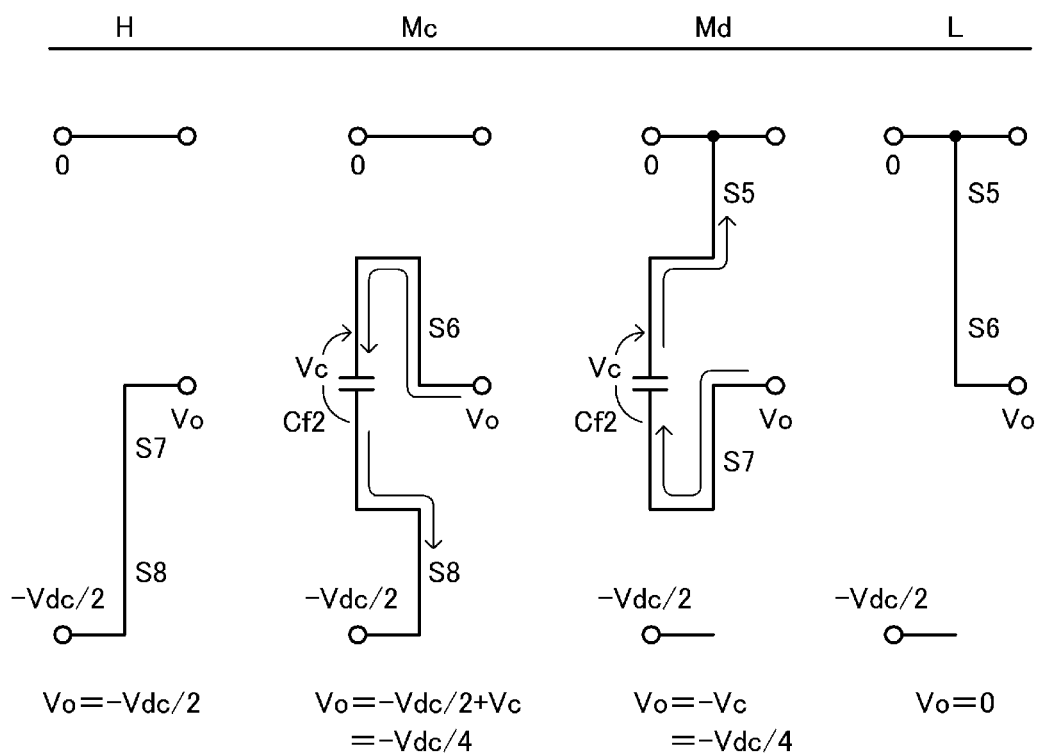
FIG. 9 illustrates equivalent circuit diagrams of the second three-level circuit in four states.

FIG. 9 illustrates the equivalent circuit diagrams of the second three-level circuit 122 in the four states. In the state H, since the switch elements S7 and S8 are turned on (ON) and the switch elements S5 and S6 are turned off (OFF), the output voltage Vo is −Vdc/2. In the state L, since the switch elements S5 and S6 are turned on (ON) and the switch elements S7 and S8 are turned off (OFF), the output voltage Vo is 0. In the state Mc, since the switch elements S6 and S8 are turned on (ON) and the switch elements S5 and S7 are turned off (OFF), the output voltage Vo is −Vdc/2+Vc. Here, the Vc is the charging voltage of the second charging and discharging capacitor Cf2. When it is assumed that Vc=Vdc/4 is satisfied, the output voltage Vo=−Vdc/4 is satisfied. In the state Md, since the switch elements S5 and S7 are turned on (ON) and the switch elements S6 and S8 are turned off (OFF), the output voltage Vo is −Vc. Here, when it is assumed that Vc=Vdc/4 is satisfied, the output voltage Vo=−Vdc/4 is satisfied. Since the charging charge amount and the discharging charge amount of the second charging and discharging capacitor Cf2 may be deemed to be equal to each other, the output voltage Vo in the state Mc and the output voltage Vo in the state Md are equal to each other. In other words, the charging voltage Vc of the second charging and discharging capacitor Cf2 is charged and discharged while centering on Vdc/4 serving as a half of Vdc/2. If a charging and discharging time constant for the second charging and discharging capacitor Cf2 is sufficiently large with respect to a switching frequency, the fluctuation range of the charging voltage Vc is small, and it may be possible to be deemed as Vc≈Vdc/4.

Figure 10:
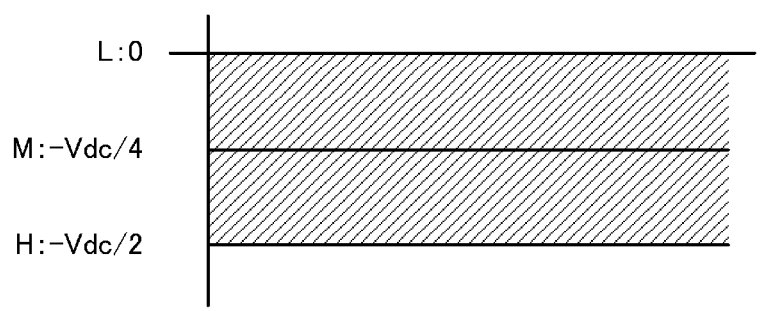
FIG. 10 is a diagram illustrating a range of a voltage capable of being obtained on the basis of an output voltage of the second three-level circuit.

FIG. 10 is a diagram illustrating the range of a voltage capable of being obtained on the basis of the output voltage of the second three-level circuit 122. As described above, as a result of the switching of the four switch elements S5 to S8, the four states H, Mc, Md, and L are selected, and hence it may be possible to output a voltage in the range of 0 to −Vdc/2.

Figure 11:
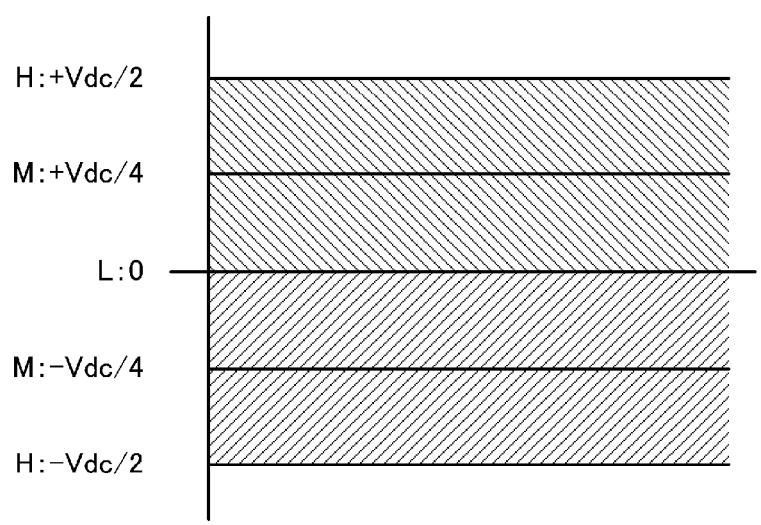
FIG. 11 is a diagram illustrating a range of a voltage capable of being obtained on the basis of voltages output from the first three-level circuit and the second three-level circuit.
Figure 13A:
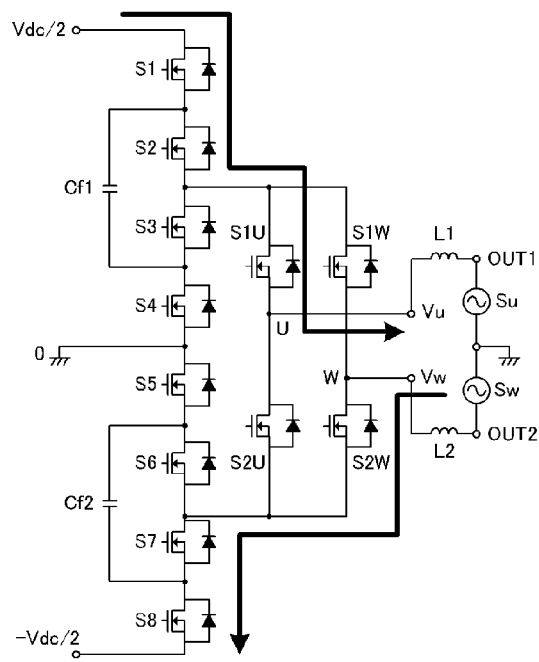
FIGS. 13A to 13D are diagrams illustrating current paths in states illustrated in FIG. 12.
Figure 13B:
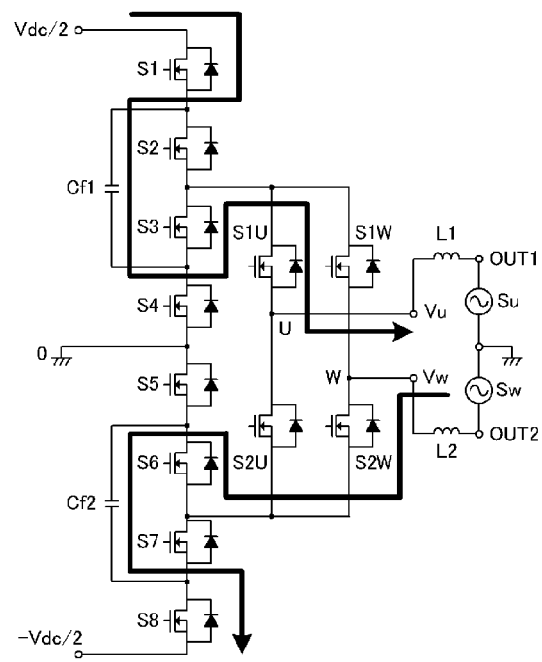
Figure 13C:
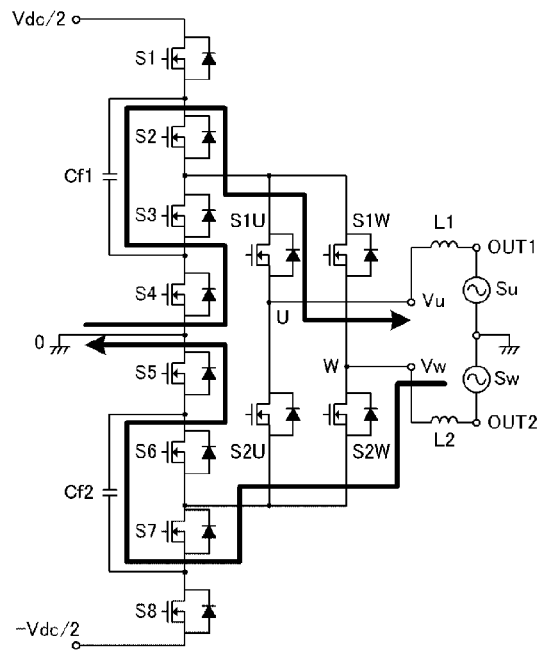
Figure 13D:
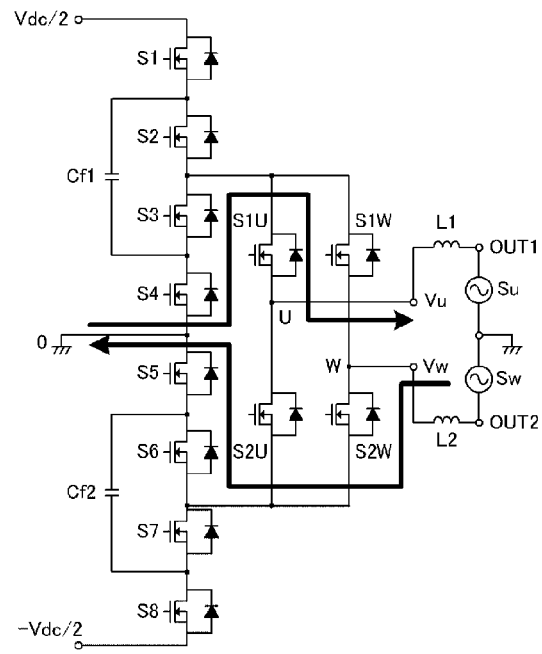
Figure 14A:
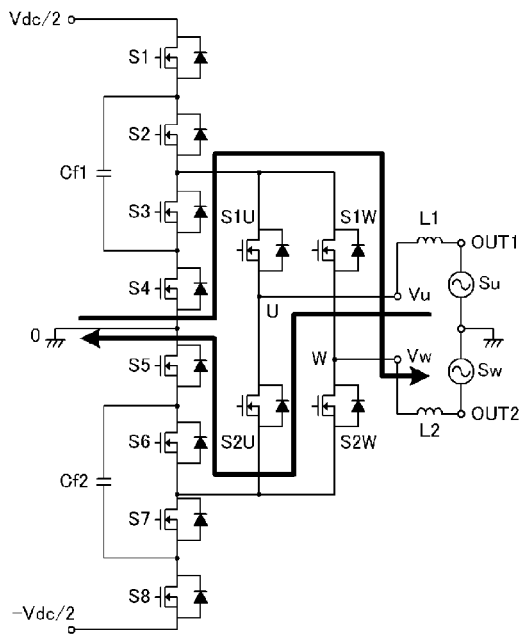
FIGS. 14A to 14D are diagrams illustrating current paths in states illustrated in FIG. 12.
Figure 14B:
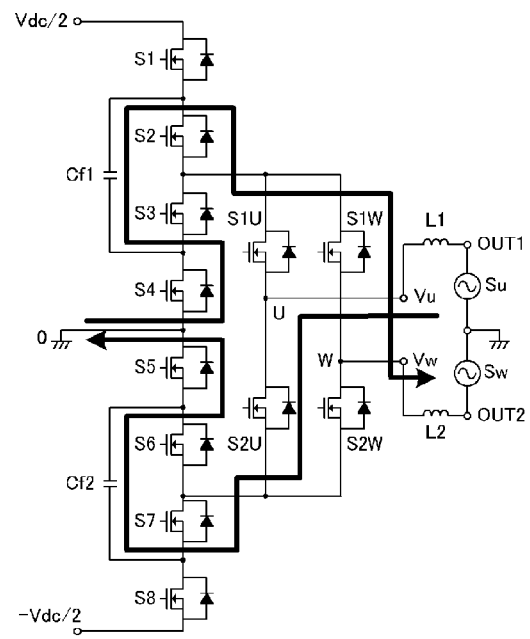
Figure 14C:
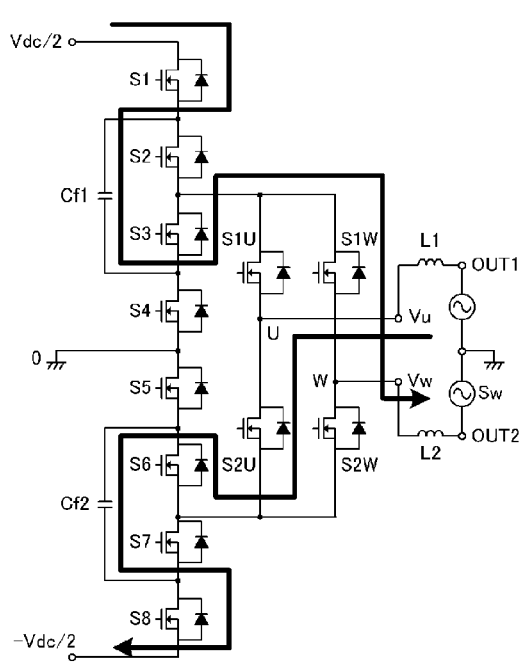
Figure 14D:
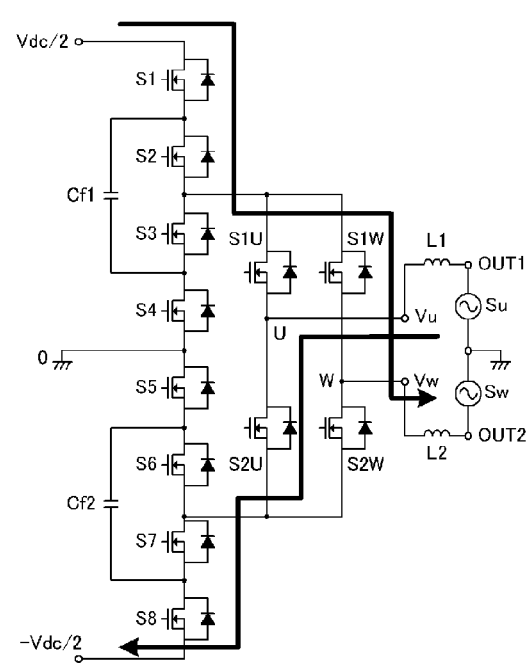

FIG. 11 is a diagram illustrating the range of a voltage capable of being obtained on the basis of voltages output from the first three-level circuit 121 and the second three-level circuit 122. In this way, due to the first three-level circuit 121 and the second three-level circuit 122, a five-level circuit is provided.

FIG. 12 is a diagram illustrating a relationship among the states of the eight preceding-stage switch elements S1 to S8, the states of the four subsequent-stage switch elements S1U, S2U, S1W, and S2W, and the instantaneous values of the output voltages Vu and Vw (refer to FIG. 2). FIGS. 13A to 13D and FIGS. 14A to 14D are diagrams illustrating current paths in eight states CP1 to CP8 illustrated in FIG. 12. The states CP1 and CP8 correspond to the states H in FIG. 5 and FIG. 9, the states CP2 and CP7 correspond to the states Mc in FIG. 5 and FIG. 9, the states CP3 and CP6 correspond to the states Md in FIG. 5 and FIG. 9, and the states CP4 and CP5 correspond to the states L in FIG. 5 and FIG. 9.

While the instantaneous values of the output voltages Vu and Vw are any of five levels of Vdc/2, Vdc/4, 0, −Vdc/4, and −Vdc/2, the eight preceding-stage switch elements S1 to S8 are subjected to PWM control using, for example, a carrier frequency of about 20 kHz so that a current injected into the system becomes a half wave of a substantially sinusoidal wave. In addition, since the output polarities of the four subsequent-stage switch elements S1U, S2U, S1W, and S2W are inverted between the anterior half cycle and the posterior half cycle of the power supply frequency (about 50 Hz or about 60 Hz, for example) of the system, a substantially sinusoidal wave-shaped current is eventually injected into the system.

Figure 15:
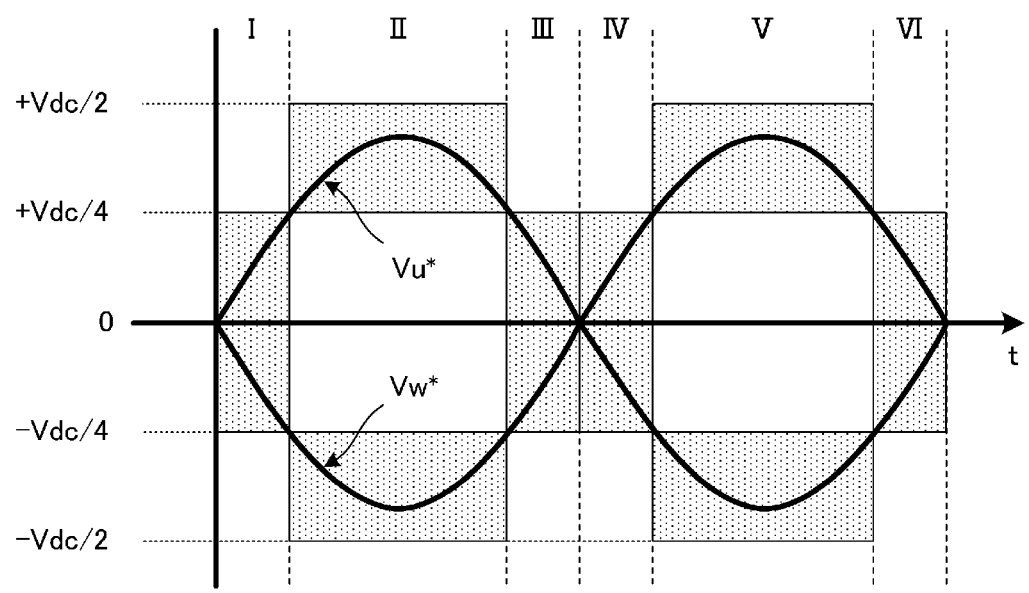
FIG. 15 is a diagram illustrating a relationship among voltages of five levels, a target value of an output voltage, and a target value of an output voltage.

FIG. 15 is a diagram illustrating a relationship among the voltages of the five levels, the target value Vu* of the output voltage Vu, and the target value Vw* of the output voltage Vw, and FIG. 16 is a diagram illustrating a relationship among time divisions and voltage divisions in FIG. 15 and switching patterns. A range filled with gray in FIG. 15 indicates a range within which a voltage may fall.

As is clear from these drawings, when the target value Vu* of the output voltage Vu falls within the range of 0 to Vdc/4, a state transition where a state transits in the order of CP4→CP2→CP4→CP3→CP4→CP2→ . . . from among the four states illustrated in FIGS. 13A to 13D is eventually repeated due to the PWM control. In addition, when the target value Vu* of the output voltage Vu falls within the range of Vdc/4 to Vdc/2, a state transition where a state transits in the order of CP1→CP2→CP1→CP3→CP1→CP2→ . . . from among the four states illustrated in FIGS. 13A to 13D is eventually repeated due to the PWM control. In addition, when the target value Vu* of the output voltage Vu falls within the range of 0 to −Vdc/4, a state transition where a state transits in the order of CP5→CP6→CP5→CP7→CP5→CP6→ . . . from among the four states illustrated in FIGS. 14A to 14D is eventually repeated due to the PWM control. In addition, when the target value Vu* of the output voltage Vu falls within the range of −Vdc/4 to −Vdc/2, a state transition where a state transits in the order of CP8→CP6→CP8→CP7→CP8→CP6→ . . . from among the four states illustrated in FIGS. 14A to 14D is eventually repeated due to the PWM control.

Also as for the target value Vw* of the output voltage Vw, a state transition according to the switching patterns illustrated in FIG. 15 and FIG. 16 is repeated due to the PWM control.

Figure 17A:
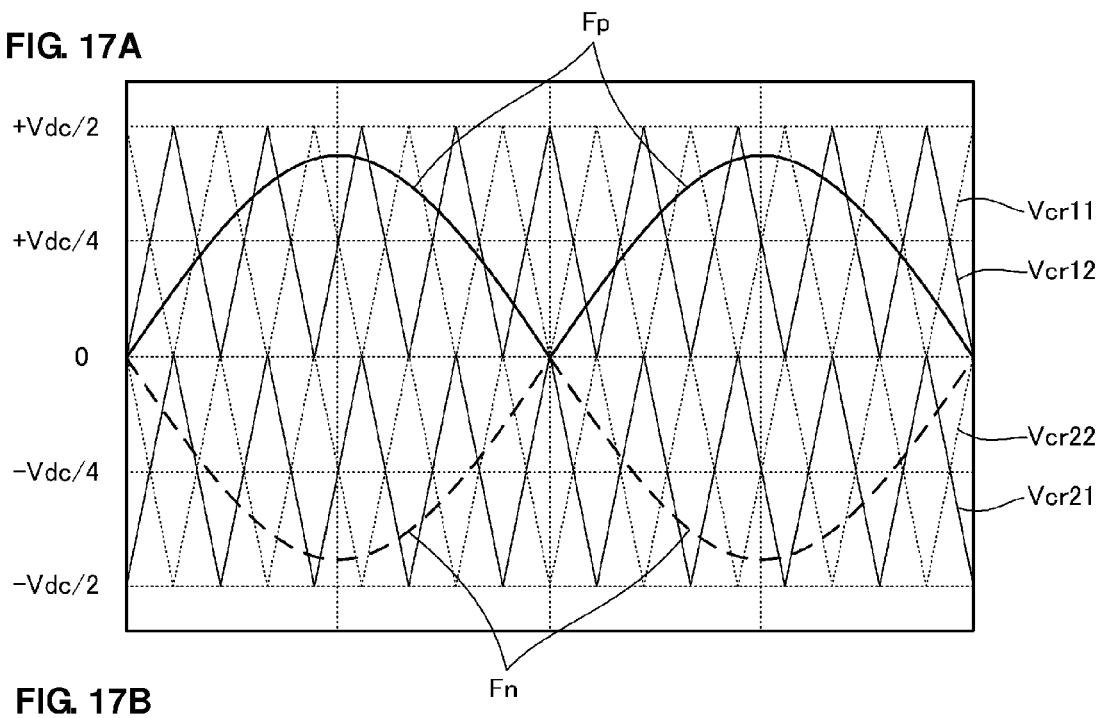
FIGS. 17A and 17B illustrate waveform diagrams of a PWM-modulated voltage and a target value when PWM control is performed with respect to the output voltage.
Figure 17B:
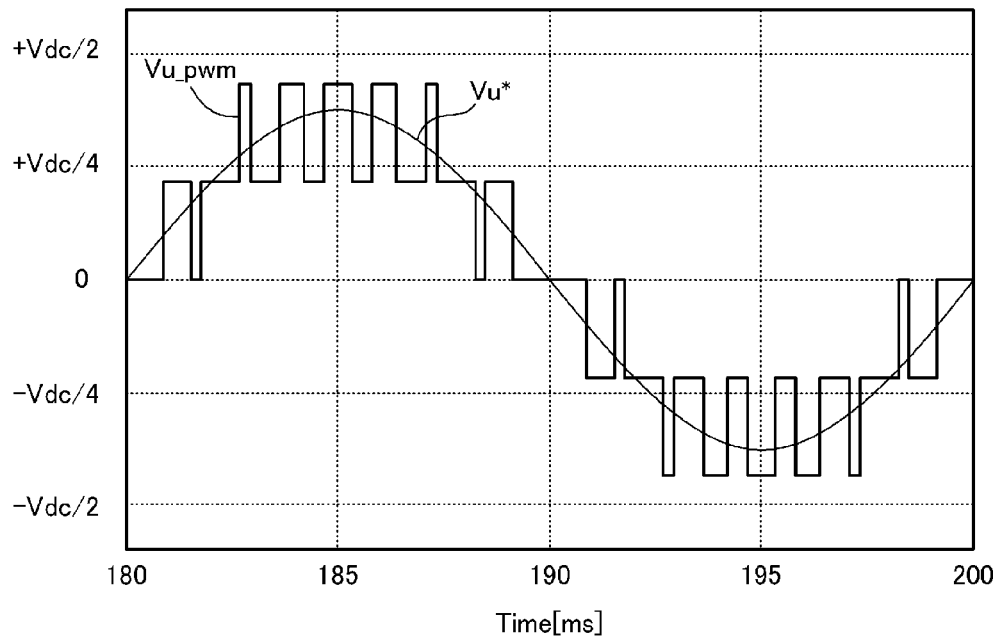

FIGS. 17A and 17B illustrate waveform diagrams of a PWM-modulated voltage Vu_pwm and the target value Vu* when the PWM control is performed with respect to the output voltage Vu. Here, substantially triangular waves Vcr11 and Vcr12 are reference voltage waveforms used for PWM modulation when the output voltage falls within the range of 0 to Vdc/2. In addition, substantially triangular waves Vcr21 and Vcr22 are reference voltage waveforms used for PWM modulation when the output voltage falls within the range of 0 to −Vdc/2. A signal Fp is a half-cycle signal of the target value Vu*, and a signal Fn is a half-cycle signal of the target value Vw*.

In this way, when the target voltage Vu* falls within the range of 0 to Vdc/4, the PWM modulation is performed using two values of 0 and Vdc/4, and when the target voltage Vu* falls within the range of Vdc/4 to Vdc/2, the PWM modulation is performed using two values of Vdc/4 and Vdc/2. In the same way, when the target voltage Vu* falls within the range of 0 to −Vdc/4, the PWM modulation is performed using two values of 0 and −Vdc/4, and when the target voltage Vu* falls within the range of −Vdc/4 to −Vdc/2, the PWM modulation is performed using two values of −Vdc/4 and −Vdc/2.

In this way, since a substantially sinusoidal voltage is generated as a result of the PWM modulation using a plurality of voltage levels, ripple currents flowing through the inductors L1 and L2 become small and losses due to the inductors L1 and L2 are reduced. Therefore, it is possible to use the small inductors L1 and L2.

Figure 18A:
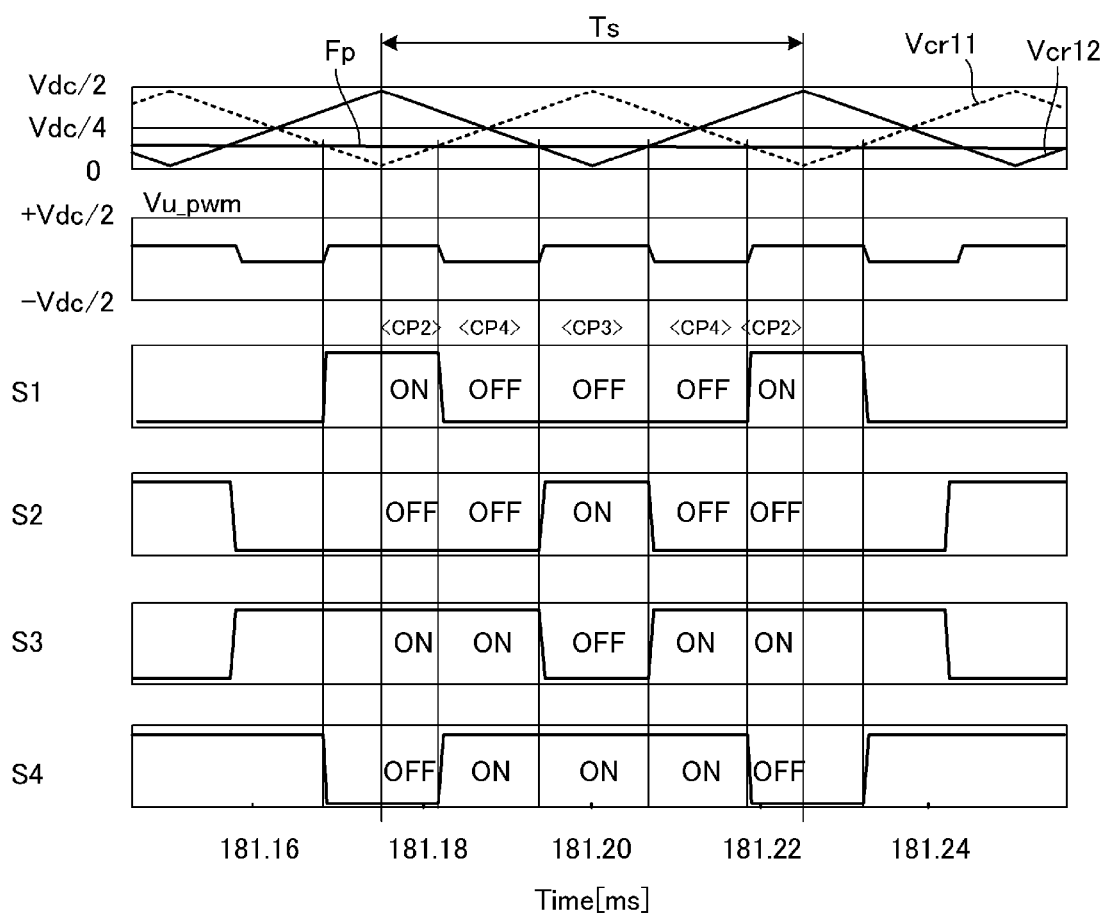
FIG. 18A illustrates a waveform of the PWM-modulated voltage and gate voltage waveforms of the switch elements when a half-cycle signal falls within a range of 0 to Vdc/4.

FIG. 18A illustrates the waveform of the PWM-modulated voltage Vu_pwm and the gate voltage waveforms of the switch elements S1 to S4 when the half-cycle signal Fp falls within a range of 0 to Vdc/4. In addition, FIG. 18B illustrates the waveform of the PWM-modulated voltage Vu_pwm and the gate voltage waveforms of the switch elements S1 to S4 when the half-cycle signal Fp falls within a range of Vdc/4 to Vdc/2.

Figure 18B:
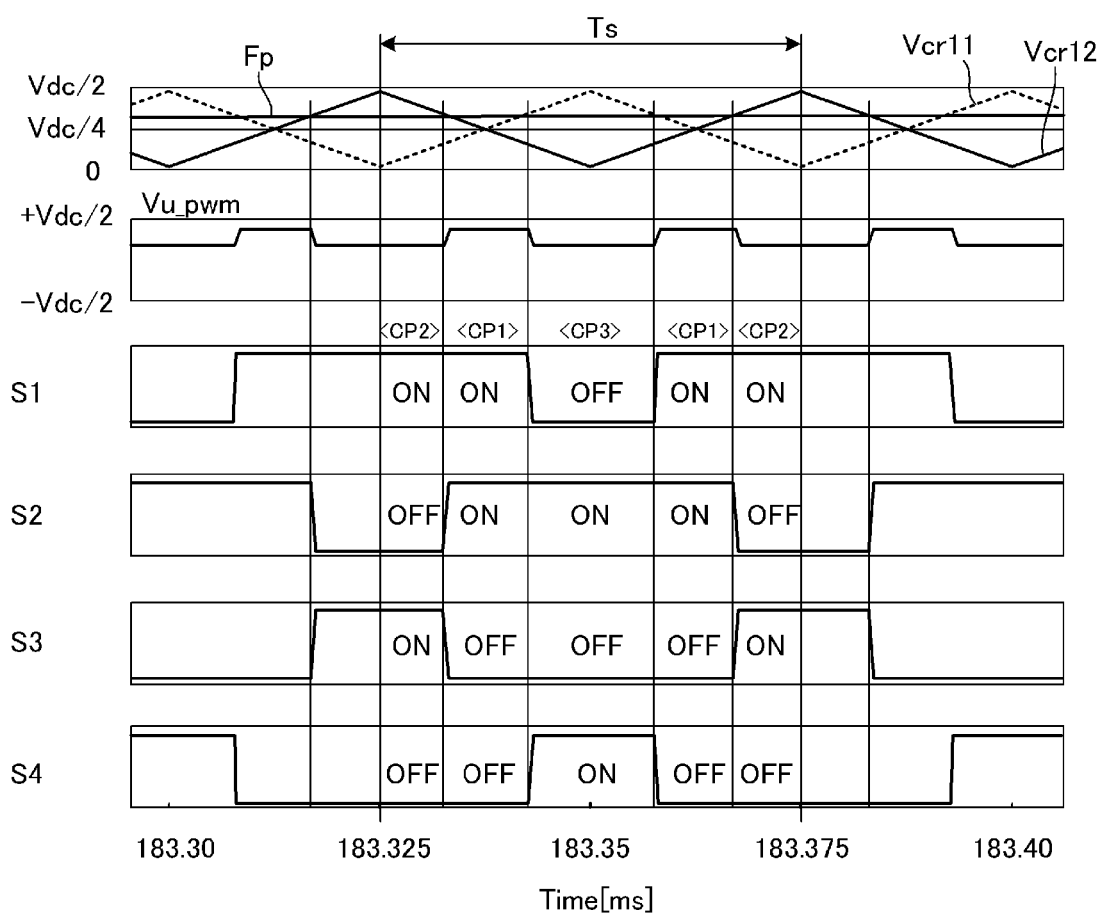
FIG. 18B illustrates a waveform of the PWM-modulated voltage and gate voltage waveforms of the switch elements when the half-cycle signal falls within a range of Vdc/4 to Vdc/2.
Figure 21A:
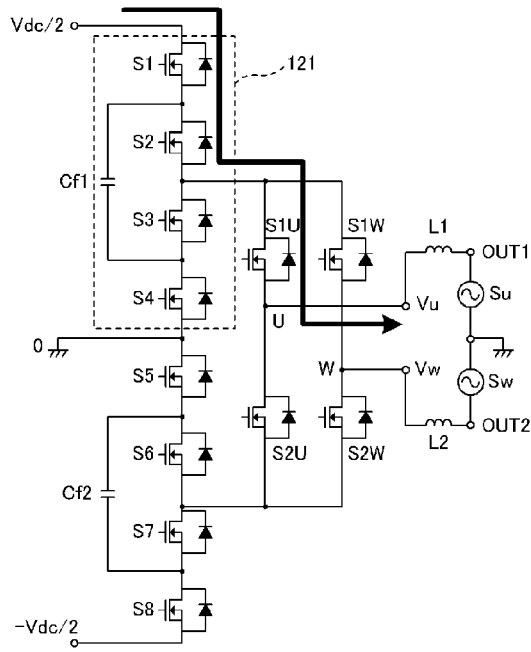
FIGS. 21A to 21D are diagrams illustrating current paths in the four states illustrated in FIG. 19A.
Figure 21B:
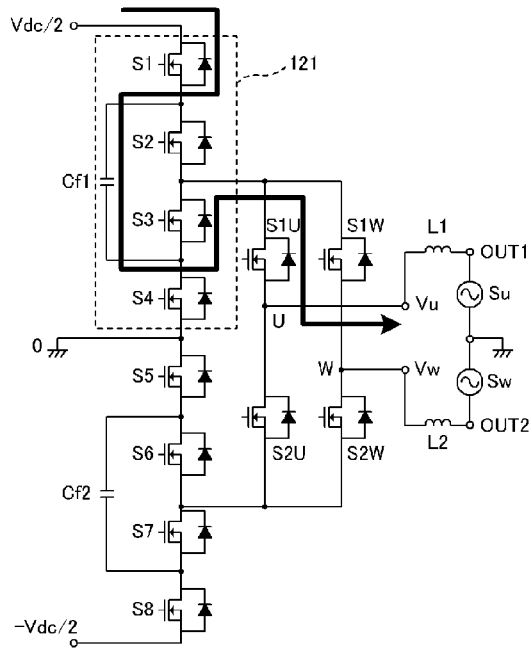
Figure 21C:
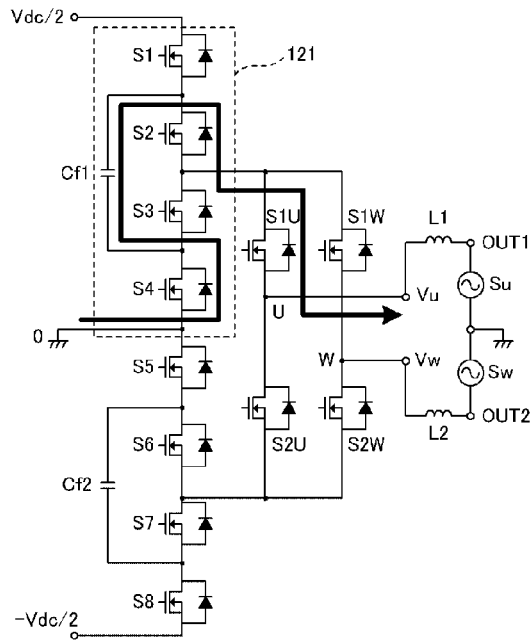
Figure 21D:
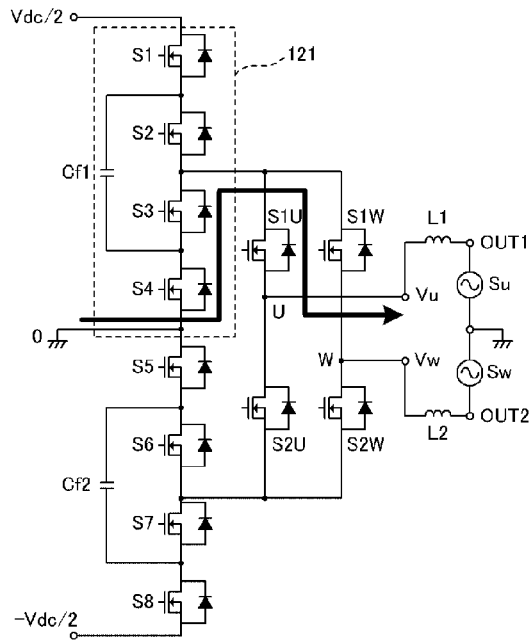
Figure 22A:
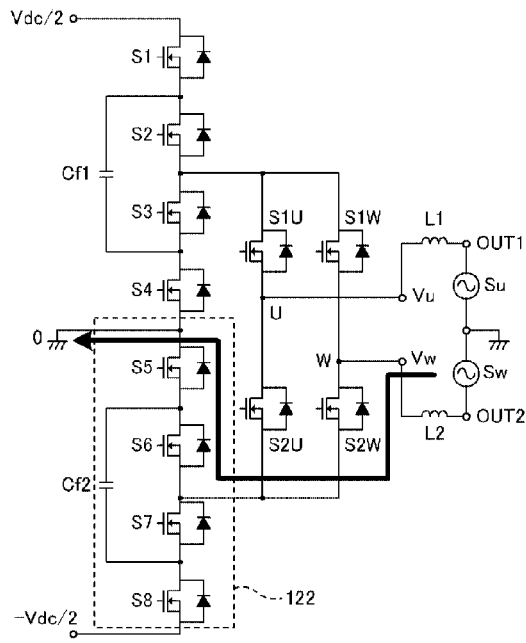
FIGS. 22A to 22D are diagrams illustrating current paths in the four states illustrated in FIG. 19B.
Figure 22B:
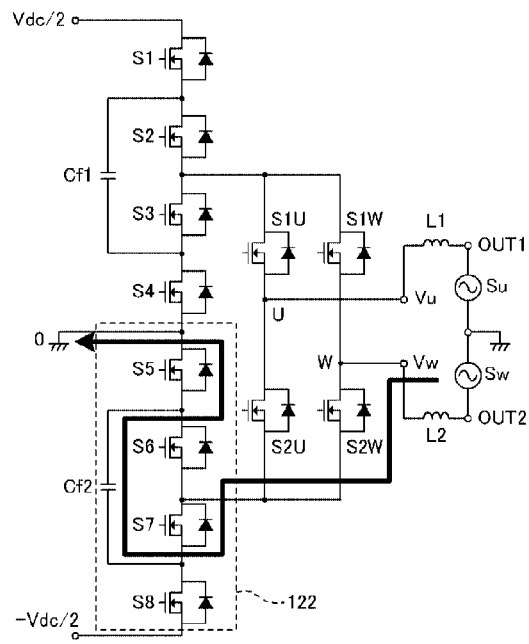
Figure 22C:
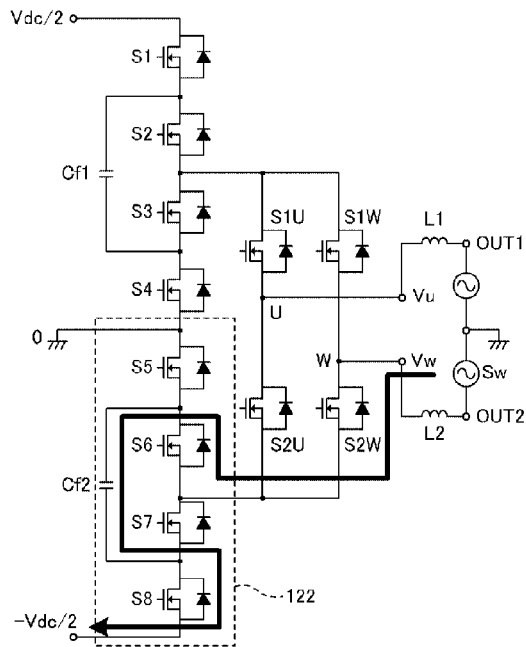
Figure 22D:
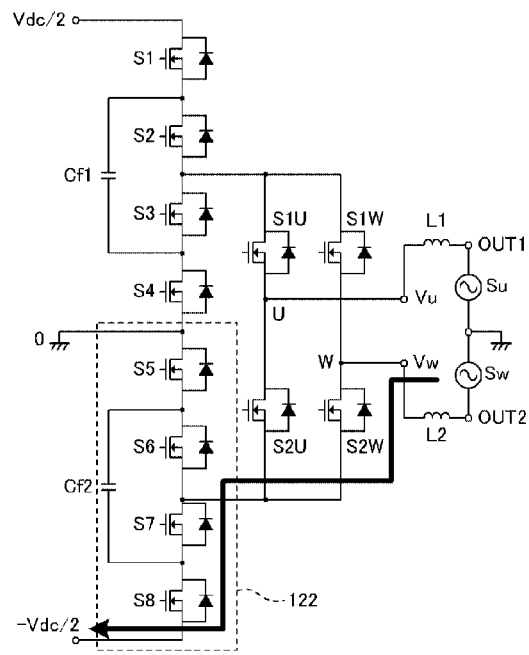

In FIG. 18A and FIG. 18B, Ts is one period of the carrier frequency of PWM modulation. States CP1 to CP4 in the drawing correspond to the states CP1 to CP4 illustrated in FIG. 12.

While, as already described, as a result of the PWM modulation of the target value Vu*, the output voltage Vo becomes a substantially rectangular wave of a binary voltage, a fluctuation due to the discharge and charge of the charging and discharging capacitor technically occurs. During a time period when the first charging and discharging capacitor Cf1 is charged, the waveform of the PWM-modulated voltage Vu_pwm is on a rising trend, and during a time period when the first charging and discharging capacitor Cf1 is discharged, the waveform of the PWM-modulated voltage Vu_pwm is on a falling trend (refer to FIG. 5). If a charging and discharging time constant for the first charging and discharging capacitor Cf1 is sufficiently large with respect to a switching frequency, it is possible to sufficiently reduce the fluctuation ranges of the rising and falling. In addition, even if the charging and discharging time constant of the first charging and discharging capacitor Cf1 is not sufficiently large with respect to the switching frequency and the waveform of the PWM-modulated voltage Vu_pwm fluctuates to some extent, an influence on the average value of the output voltage is small. The above-mentioned function also applies to the second charging and discharging capacitor Cf2.

Second Preferred Embodiment

In the first preferred embodiment, in particular as illustrated in FIGS. 13A to 13D and FIGS. 14A to 14D, an example has been illustrated where the switch elements S1 to S4 in the first three-level circuit 121 and the switch elements S5 to S8 in the second three-level circuit 122 are preferably symmetrically coordinated with each other and are driven. However, the present invention is not limited to a configuration where driving is performed in such a way. In a second preferred embodiment, an example will be illustrated where the switch elements S1 to S4 in the first three-level circuit 121 and the switch elements S5 to S8 in the second three-level circuit 122 preferably are independently driven.

The circuit configuration of an inverter device in the second preferred embodiment preferably is the same or substantially the same as that illustrated in FIG. 1 and FIG. 2. Accordingly, the symbols illustrated in FIG. 1 and FIG. 2 will be referred to in the following description.

FIG. 19A is a diagram illustrating a relationship between the states of the switch elements S1 to S4 in the first three-level circuit 121 and the output voltage thereof in the inverter device in the second preferred embodiment, and FIG. 19B is a diagram illustrating a relationship between the states of the switch elements S5 to S8 in the second three-level circuit 122 and the output voltage thereof. FIG. 20 is a diagram illustrating a relationship among a time division illustrated in FIG. 15, the switching patterns of the first and second three-level circuits, the state of the bridge clamping circuit, and the average voltages of the terminals U and V. Furthermore, FIGS. 21A to 21D are diagrams illustrating current paths in four states CP1 to CP4 illustrated in FIG. 19A, and FIGS. 22A to 22D are diagrams illustrating current paths in four states CP5 to CP8 illustrated in FIG. 19B.

As is clear from these drawings, the switch elements S1 to S4 in the first three-level circuit 121 and the switch elements S5 to S8 in the second three-level circuit 122 may also be independently driven. For example, the state CP1 illustrated in FIG. 21A and the state CP8 illustrated in FIG. 22D may not coordinate with each other.

Third Preferred Embodiment

While, in the first and second preferred embodiments, examples have been illustrated where the positive voltage and the negative voltage preferably are applied to the first input end IN1 and the second input end IN2, respectively, the present invention is not limited to a configuration where two voltages whose polarities are positive and negative are input. In a third preferred embodiment, an example will be illustrated where a direct-current voltage having a single polarity is input.

Figure 23:
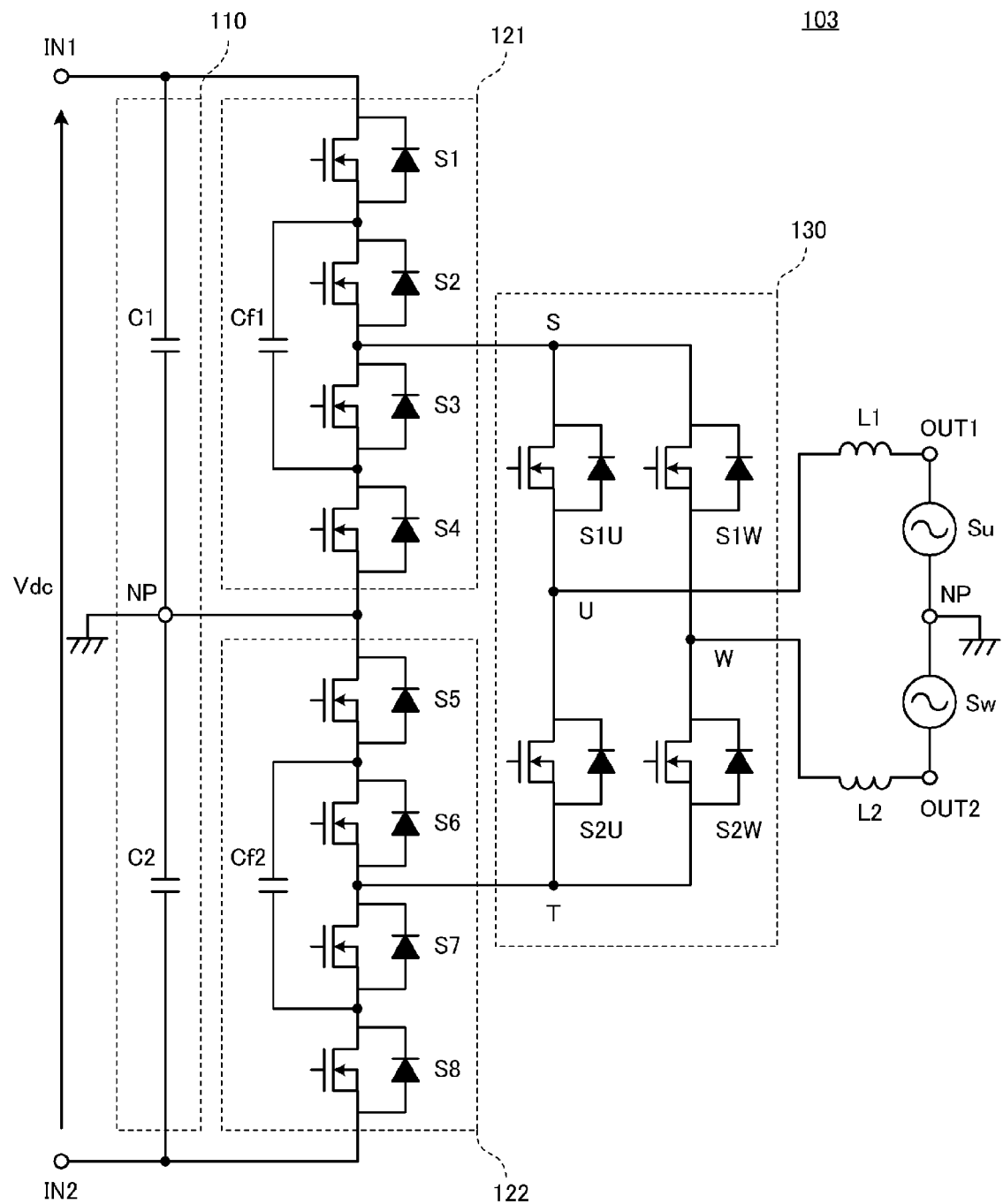
FIG. 23 is a circuit diagram of an inverter device according to a third preferred embodiment of the present invention.

FIG. 23 is the circuit diagram of an inverter device 103 according to the third preferred embodiment. This inverter device 103 includes a first input end IN1 and a second input end IN2, into which a direct-current power supply voltage is input, and a first output end OUT1 and a second output end OUT2, from which alternating-current voltages are output. A direct-current voltage generated by, for example, a solar power generation panel, is applied between the first input end IN1 and the second input end IN2.

A capacitor voltage-dividing circuit 110 is connected between the first input end IN1 and the second input end IN2. This capacitor voltage-dividing circuit 110 is a circuit including two capacitors C1 and C2 connected in series and a connection point between the capacitors C1 and C2 is connected to a neutral point NP.

The first three-level circuit 121 is connected between the first input end IN1 and the neutral point NP, and the second three-level circuit 122 is connected between the neutral point NP and the second input end IN2. The other circuits are preferably the same or substantially the same as the circuits illustrated in FIG. 2.

The capacitance values of the capacitors C1 and C2 in the capacitor voltage-dividing circuit 110 are equal to each other, and each of the capacitors C1 and C2 generates a voltage of a half of an applied voltage. When the direct-current voltage applied between the first input end IN1 and the second input end IN2 is expressed as Vdc, the electric potential of the second input end IN2 is 0 V, the electric potential of the neutral point NP is Vdc/2, and the electric potential of the first input end IN1 is Vdc. When the electric potential of the neutral point NP is deemed to be 0 V, the electric potential of the first input end IN1 is Vdc/2 and the electric potential of the second input end IN2 is −Vdc/2. Therefore, a circuit operation is the same as the inverter device illustrated in the first preferred embodiment.

By providing the capacitor voltage-dividing circuit 110 in this way, the direct-current voltage having a single polarity is input, and it is possible to supply electric power to the single-phase three-wire system.

While preferred embodiments of the invention have been described above, it is to be understood that variations and modifications will be apparent to those skilled in the art without departing from the scope and spirit of the invention. The scope of the invention, therefore, is to be determined solely by the following claims.

What is claimed is:

1. An inverter device comprising:
   a first three-level circuit including first, second, third and fourth preceding-stage switch elements connected in series between a first input end of a direct-current power supply and a neutral point and a first charging and discharging capacitor including a first end that is connected to a connection point between the first preceding-stage switch element and the second preceding-stage switch element and a second end that is connected to a connection point between the third preceding-stage switch element and the fourth preceding-stage switch element;
   a second three-level circuit including fifth, sixth, seventh, and eighth preceding-stage switch elements connected in series between a neutral point and a second input end of the direct-current power supply and a second charging and discharging capacitor including a first end that is connected to a connection point between the fifth preceding-stage switch element and the sixth preceding-stage switch element and a second end that is connected to a connection point between the seventh preceding-stage switch element and the eighth preceding-stage switch;
   a bridge clamping circuit including first, second, third and fourth subsequent-stage switch elements bridge-connected to first, second, third and fourth terminals wherein a first end is connected to a connection point between the second preceding-stage switch element and the third preceding-stage switch element and a second end is connected to a connection point between the sixth preceding-stage switch element and the seventh preceding-stage switch element;
   a first inductor connected between a first output end and a connection point between the first subsequent-stage switch element and the second subsequent-stage switch element in the bridge clamping circuit; and
   a second inductor configured connected between a second output end and a connection point between the third subsequent-stage switch element and the fourth subsequent-stage switch element in the bridge clamping circuit.

2. The inverter device according to claim 1, wherein
the first subsequent-stage switch element and the fourth subsequent-stage switch element are simultaneously turned on or off, the second subsequent-stage switch element and the third subsequent-stage switch element are simultaneously turned off or on, and switching frequencies of the first, second, third and fourth subsequent-stage switch elements are a frequency of an alternating-current power supply voltage occurring between the first output end and the second output end; and
switching frequencies of the first, second, third, fourth, fifth, sixth, seventh and eighth switch elements are higher than the switching frequencies of the first, second, third and fourth subsequent-stage switch elements, and frequencies at which a smoothing effect due to the first inductor and the second inductor occurs.

3. The inverter device according to claim 1, further comprising:
two capacitors connected between the first input end and the second input end of the direct-current power supply and connected in series; and
a capacitor voltage-dividing circuit including a neutral point that is a connection point between the two capacitors.

4. The inverter device according to claim 1, wherein the first, second, third, fourth, fifth, sixth, seventh and eighth preceding-stage switch elements are MOS-FETs.

5. The inverter device according to claim 1, wherein the power-system-interconnected inverter device is a five-level circuit that performs voltage conversion using five voltage levels.

6. The inverter device according to claim 1, wherein the first three-level circuit and the second three-level circuit are arranged to define a five-level circuit that performs voltage conversion using five voltage levels.

7. The inverter device according to claim 1, wherein each of the first, second, third and fourth preceding-stage switch elements includes a MOS-FET.

8. The inverter device according to claim 1, wherein each of the fifth, sixth, seventh and eighth preceding-stage switch elements includes a MOS-FET.

9. The inverter device according to claim 1, wherein the first, second, third and fourth preceding-stage switch elements of the first three-level circuit, and the fifth, sixth, seventh, and eighth preceding-stage switch elements of the second three-level circuit are symmetrically coordinated with each other and driven together.

10. The inverter device according to claim 1, wherein the first, second, third and fourth preceding-stage switch elements of the first three-level circuit, and the fifth, sixth, seventh, and eighth preceding-stage switch elements of the second three-level circuit are driven independently.

11. The inverter device according to claim 1, wherein the first input end is arranged to receive a positive voltage and the second input end is arranged to receive a negative voltage.

12. The inverter device according to claim 1, wherein the first input end and the second input end are arranged to receive a direct-current voltage having a single polarity.

13. The inverter device according to claim 12, further comprising a capacitor voltage-dividing circuit connected between the first input end and the second input end.

14. The inverter device according to claim 13, wherein the capacitor voltage-dividing circuit includes two capacitors connected in series and a connection point between the two capacitors is connected to a neutral point.

15. The inverter device according to claim 14, wherein the first three-level circuit is connected between the first input end and the neutral point, and the second three-level circuit is connected between the neutral point and the second input end.

* * * * *